United States Patent
Strothmann

(10) Patent No.: US 6,415,880 B1
(45) Date of Patent: Jul. 9, 2002

(54) TRANSPORTATION SYSTEM

(76) Inventor: Rolf Strothmann, Kobenhüttenweg 49, D-66123 Saarbrücken (DE)

( * ) Notice: Subject to any disclaimer, the term of this patent is extended or adjusted under 35 U.S.C. 154(b) by 0 days.

(21) Appl. No.: 09/463,790

(22) PCT Filed: Jul. 22, 1998

(86) PCT No.: PCT/EP98/04595

§ 371 (c)(1),
(2), (4) Date: Jan. 27, 2000

(87) PCT Pub. No.: WO99/06259

PCT Pub. Date: Feb. 11, 1999

(30) Foreign Application Priority Data

Aug. 1, 1997 (DE) .................................. 297 13 739 U

(51) Int. Cl.[7] .............................................. B62D 51/04
(52) U.S. Cl. .................... 180/19.3; 180/65.1; 280/79.2
(58) Field of Search ............................ 180/65.1, 65.2, 180/65.3, 19.1, 19.3; 280/47.17, 47.18, 47.2, 47.26, 47.34, 47.35, 79.2, 33.975, 638, 639

(56) References Cited

U.S. PATENT DOCUMENTS

| | | | | |
|---|---|---|---|---|
| 3,874,531 A | * | 4/1975 | Mayo | 280/47.35 |
| 3,896,946 A | * | 7/1975 | Forsyth et al. | 280/638 |
| 3,955,847 A | * | 5/1976 | Schiowitz | 410/4 |
| 4,090,577 A | * | 5/1978 | Moore | 180/65.2 |
| 4,441,734 A | * | 4/1984 | Schlissel | 280/47.26 |
| 5,064,012 A | * | 11/1991 | Losego | 180/65.1 |
| 5,251,711 A | * | 10/1993 | Meyer et al. | 180/19.3 |
| 5,346,028 A | * | 9/1994 | Cassano | 180/65.1 |
| 5,373,910 A | * | 12/1994 | Nixon | 180/65.1 |
| 5,423,651 A | * | 6/1995 | Dinverno | 280/47.35 |
| 5,655,244 A | * | 8/1997 | Minakami et al. | 410/3 |
| 5,657,828 A | * | 8/1997 | Nagamachi | 180/19.3 |
| 5,664,635 A | * | 9/1997 | Koga et al. | 180/65.3 |
| 5,839,738 A | * | 11/1998 | Ozark | 280/47.26 |
| 5,899,285 A | * | 5/1999 | Corbelo | 180/65.1 |
| 6,276,471 B1 | * | 8/2001 | Kratzenberg et al. | 180/19.3 |

FOREIGN PATENT DOCUMENTS

| | | | | |
|---|---|---|---|---|
| DE | 4103379 | 8/1991 | | |
| EP | 2708898 | 2/1995 | | |
| EP | 0811469 | 12/1997 | | |
| FR | 2370604 | * 6/1978 | | 180/19.3 |
| JP | 60-33106 | * 2/1985 | | 280/47.35 |
| WO | 9503096 | 2/1995 | | |

* cited by examiner

*Primary Examiner*—Frank Vanaman
(74) *Attorney, Agent, or Firm*—Friedrich Kueffner

(57) ABSTRACT

A transportation system has a mobile transportation device and a vehicle larger than the mobile transportation device, wherein the mobile transportation device can be carried in the vehicle and operated like a cart driven by muscle force by pulling or pushing. The vehicle carries the mobile transportation device. The mobile transportation device has an electrical drive that is activated by the operation of the mobile transportation device, wherein the electrical drive is activated by manipulation of the mobile transportation device. The mobile transportation device, when carried in the vehicle, is in functional connection with the vehicle. At least one of a device for charging the battery of the electrical drive and a signaling device is provided. The device for charging the battery is in communication with an electrical system of the vehicle, and the signaling device indicates the presence or absence of the mobile transportation device in the vehicle.

22 Claims, 4 Drawing Sheets

TRANSPORTATION SYSTEM

BACKGROUND OF THE INVENTION

1. Field of the Invention

The invention relates to new transportation system in which transportation means are expediently combined.

2. Description of the Related Art

This transportation system according to the invention is characterized by a mobile transportation device to be carried in a vehicle that is larger than the transportation device. The mobile transportation device can be operated in the same way as a cart which is driven by muscle power by pushing and/or pulling and comprises an electrical drive mechanism which is activated by operating the cart. The vehicle has provisions for carrying the mobile transportation device.

Advantageously, the invention can solve transportation problems which result when the larger vehicle for some reason cannot reach directly the loading or unloading location and the objects to be loaded or unloaded thus must be transported across a relatively large distance to or from the vehicle. It is now ensured that for these transportation needs a mobile transportation device is available at any time by inventively carrying it in the vehicle. Carrying the transportation device within the vehicle does not present any particular problems because the vehicle is inventively designed for such carrying purposes. The vehicle and the transportation device thus form a functional unit.

SUMMARY OF THE INVENTION

According to a possible application field for the present invention, the larger vehicle is preferably a car or minivan, and the mobile transportation device provides loading capacities which are comparable to those of shopping carts as they are used in wholesale markets where they are used for transporting the goods purchased from the store to the parking lot. Accordingly, the aforementioned embodiment of the inventive transportation system can be used for shopping in inner city areas, where between the sale location and the parking lot generally greater distances must be overcome than even in wholesale markets, but where shopping carts for general use are unavailable. The invention thus eliminates the inconveniences often accompanying shopping in inner city areas of transporting purchased goods over greater distances to a parking lot. Accordingly, the invention can encourage that the essentially more interesting shopping in the inner city area is preferred over shopping at wholesale markets at the edge of town. The invention thus in the end provides a contribution to the preservation of inner cities.

Because of the electrical drive, heavier purchased goods, whose purchase in inner city stores had hardly been considered because of the inconvenient transportation, can be transported without effort.

Preferably, the electrical drive unit comprises a drive control that detects via sensors the muscle force exerted for driving and then adjusts the drive force of the drive unit in a compensating manner based on a predetermined value of a muscle force to be exerted. The movable transportation device with a drive unit controlled in this way thus provides the user with a drive resistance that is constant under any driving condition and that can be adjusted so as to be comfortable, while the much great portion of the required drive force is provided by the electrical drive unit.

Preferably, the predetermined value of the muscle force to be exerted can be adjusted in order to take into account individual requirements. Since the user himself delivers a comfortably determined portion of the drive energy, the battery capacity of the drive can be dimensioned correspondingly small which has a beneficial effect on the total mass of the mobile transporting device.

The motor-driven mobile transportation device is thus to be operated like a device to be driven by pushing or pulling wherein the transportation device for changing the travel direction can be steered by a pulling or/and pushing rod that transmits the muscle force.

As provisions for transporting the transportation device, the vehicle may be provided with preferably standardized holding devices. These holding devices, for example, comprise a shape-matched receiving space for the transportation device and/or shape-matched receiving niches for portions of the transportation device so that it can be stored within the vehicle in a safe and space-saving manner. The holding devices can comprise additional means for securing the transportation device to the vehicle.

Advantageously, the mobile transportation device can be folded with reduction of its size to standardized dimensions, preferably collapsed to standard dimensions and the holding devices are thus provided for securing, optionally also for holding together, the transportation device in the collapsed state. It is also possible that the holding devices can assist in collapsing the transportation device in that, for example, the mobile device for the purpose of collapsing is fastened to the holding locations so as to be suitably supported.

In a preferred embodiment of the invention the transportation device that is being carried in the vehicle is functionally connected to the vehicle. For example, a device, connected to the electrical system of the vehicle is provided for charging the battery of the electrical drive. A further functional connection with the vehicle could be that the vehicle comprises a signaling device which indicates the presence or absence of the mobile device in the vehicle. With such a signaling device it can be ensured that the mobile device after use is again stored in the vehicle and is not left behind. In the extreme, it could be provided that the engine of the vehicle cannot be started when the mobile transportation device is not properly stored in the vehicle.

In a special embodiment, the mobile transportation device comprises a container or can be coupled to a container for receiving goods, wherein this container preferably has standardized dimensions. Accordingly, the larger vehicle can have standardized receiving spaces, and it is possible that the mobile transportation device can be driven into such a receiving space for being carried. In addition to being part of the transportation system, such standardized small containers could be of general use for sending objects, wherein correspondingly standardized receiving mounts, for example, in storage or sales rooms are provided.

BRIEF DESCRIPTION OF THE DRAWINGS

The invention will now be explained and described in detail with the aid of one embodiment and the accompanying drawings relating to this embodiment. It is shown in.

DESCRIPTION OF THE PREFERRED EMBODIMENT

Figure 1:
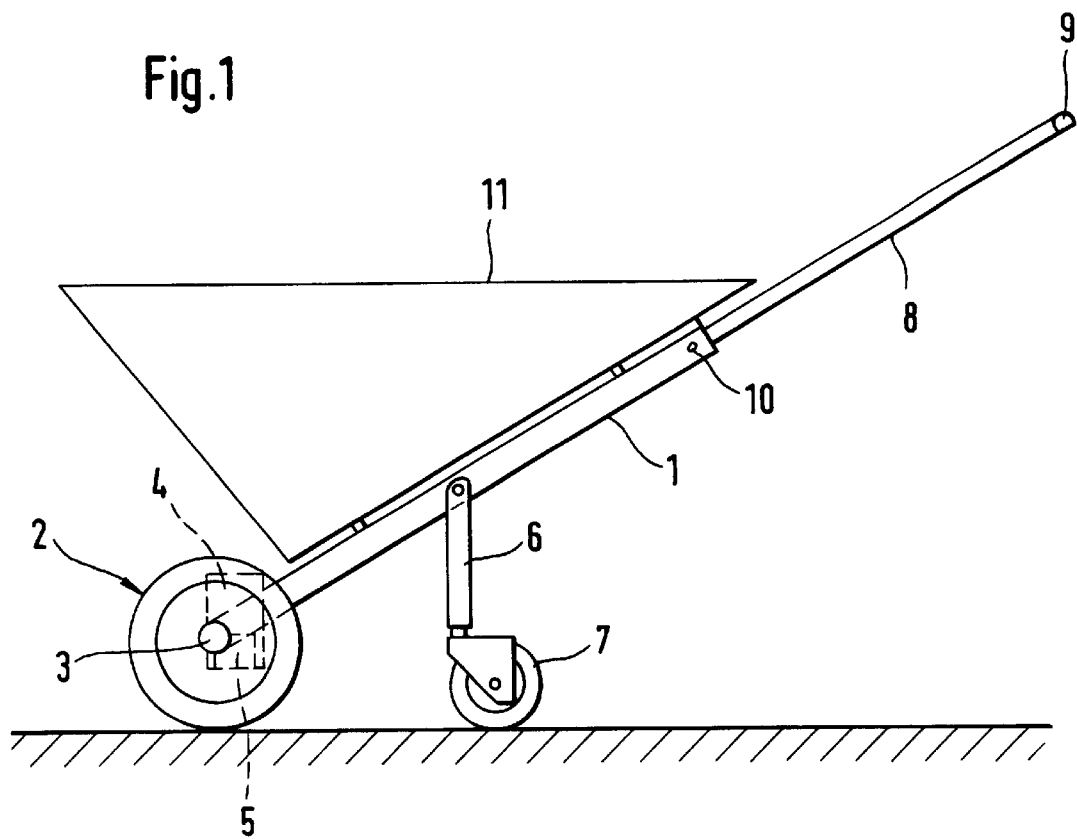
FIG. 1 one embodiment of the mobile transportation device for use according to the invention.
Figure 6:
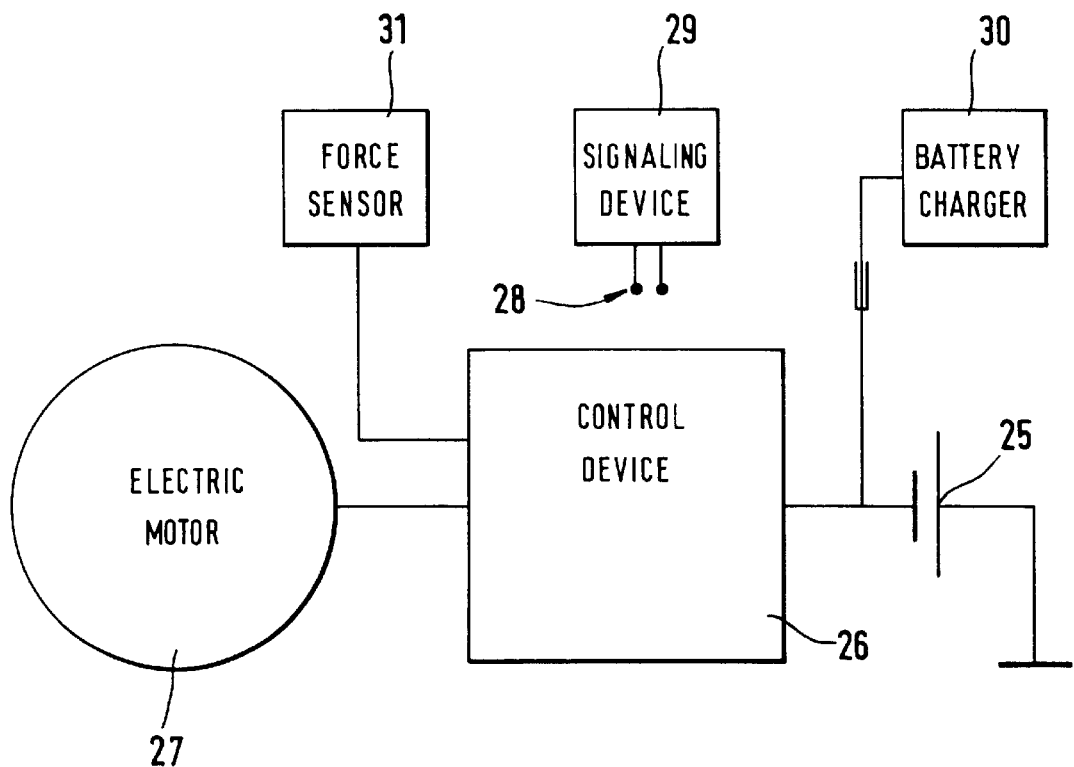
FIG. 6 a block diagram of compounds of the transportation device and the vehicle for carrying the mobile transportation device.

In FIG. 1 and FIG. 6 a mobile transportation device in the form of a shopping cart with a support frame 1 is represented. A wheel pair 2 of wheels spaced apart from one another is provided on the support frame. A battery compartment 4 for a battery 25 and a housing 5 for a control device 26 are provided on the axle 3 connecting the wheels. Electric motors 27 are accommodated in the wheels of the wheel pair 2, and their rotors are respectively integrated into the wheels of the wheel pair 2.

A support bracket 6 is connected to the support frame 1 for supporting a follower support wheel 7 rotatable about of vertical axis. The support bracket 6 with the support wheel 7 can be locked in the position shown in FIG. 1 by devices that are not shown.

The reference numeral 8 indicates in FIG. 1 a pulling/pushing rod pair whose pushing rods are connected at one end thereof by a grip 9. The pushing rods of the pushing rod pair are slidable in tubular parts of the support frame 1 and can be secured in the position shown in FIG. 1 against movement in the tubular parts by a locking bolt 10.

In the shown embodiment, a basket-shaped cargo container 11 is provided on the support frame 1.

For reducing the dimensions of the mobile device, the cargo container can be collapsed so that its parts extend substantially parallel to the support frame 1. The support bracket 6 with the support wheel 7 can be folded in the direction toward the wheel pair 2, and the pulling and pushing rod pair with the grip 9 can be pushed into the tubular parts of the support frame 1.

Figure 2:
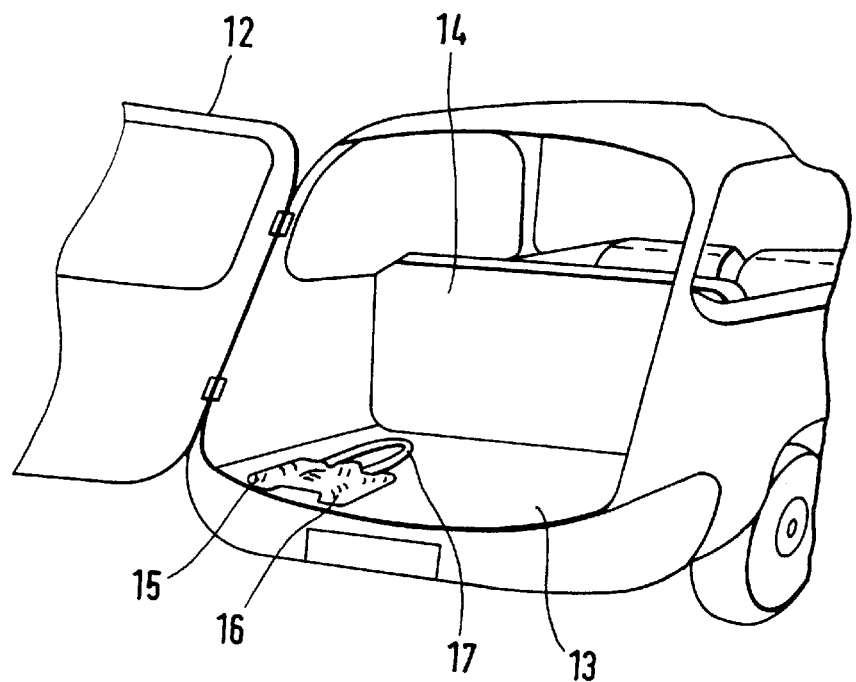
FIG. 2 one embodiment of a vehicle designed for carrying the mobile transportation device of FIG. 1.

Reference is now made to FIG. 2 where the rear end of a minivan with open hatch 12 is illustrated. Within the loading floor surface 13, which extends behind the rear seat 14 of the minivan, a depressed profile is provided into which the mobile device according to FIG. 1 can be inserted. The depressed profile has main depressions 15 and 16 for the wheel pair 2. A groove-shaped depressed profile 17 is provided for inserting therein a portion of the support frame 1 and. of the grip 9.

In the minivan, devices 30 are provided for charging the battery 25 in the battery compartment 4 during carrying of the mobile transportation device as well as switching contacts 28, by which a signaling device 29 of the vehicle can be actuated depending on the presence or absence of the device to be carried.

The mobile device according to FIG. 1 which is inserted into the depressed profile is locked in the loading floor 13 against displacement and is thus securely stored within the vehicle. Fastening elements embracing the device in the form of a bracket could be provided as additional securing means.

For use of the transportation device, the collapsed shopping cart which is accommodated in the depressed profile is lifted out of the depressed profile and is then brought into the state shown in FIG. 1 in which, among other things, the pulling/pushing rod pair 8 is pulled out of the tubular parts of the support frame 1. Folding out the support wheel 7 is optional and not required, when the transport of heavy objects is not intended.

The motor control 26 mounted within the housing 5 receives measuring signals from a force sensor 31, shown in FIG. 6, which determines the pulling or/and pushing force exerted by the user based on deformations of the support frame 1. With a control mechanism provided in the control device 26, the driving torque of the motors 27 provided within the wheels 2 is always controlled such that the mobile device will always provide identical driving resistance for the user, independent of the driving conditions. In WO 95/03096 and the corresponding U.S. Pat. No. 5,540,296 which is incorporated by reference a golf cart is disclosed which has such a drive control and the operational details of such a drive can be taken from this prior art reference.

Upon return to the vehicle, the objects transported within the cargo container 11 can be stored on the loading floor 13 together with the mobile transportation device.

For collapsing the mobile transportation device, it is expedient to first insert the wheels of the wheel pair 2 into the main depressions 15 and 16 so that the device is secured such that the pulling/pushing rod pair can be easily pushed into the tubular parts of the support frame 1 and the support wheel 7 can be collapsed. The support frame 1 is then pivoted so that a portion thereof can be lowered into the groove depression 17 and the support wheel 7 into the depressed space between the main depressions 15 and 16. Finally, the cargo container 11 can be folded so that it extends substantially parallel to the support frame 1 and provides a support surface for the cargo.

Figure 3:
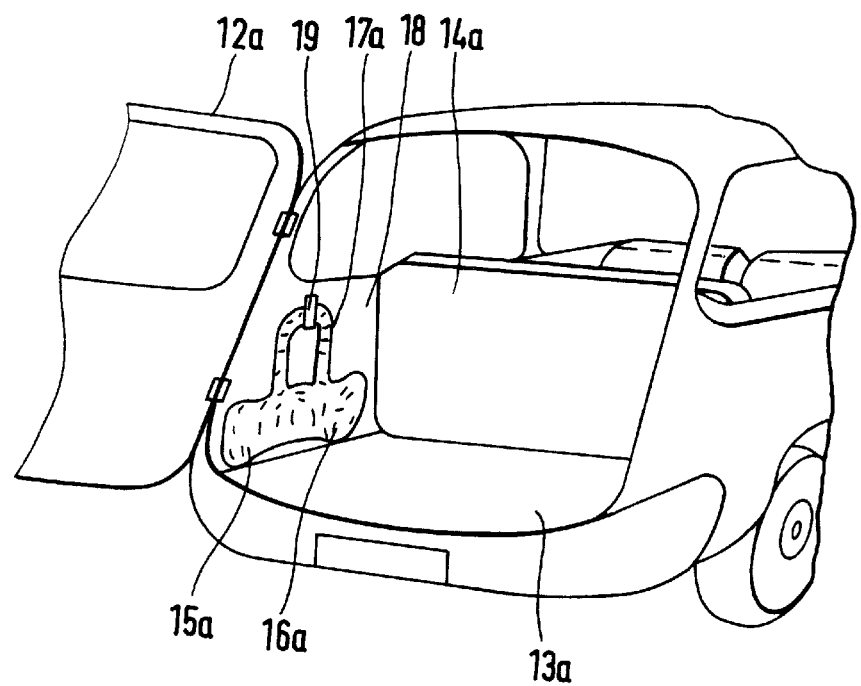
FIG. 3 a further embodiment of a vehicle designed for carrying the mobile transportation device of FIG. 1.

The aforementioned signaling device indicates to the driver that the mobile transportation device is within the vehicle and has been properly stored. During carrying in the vehicle, the battery of the mobile device can be charged by the electrical system of the vehicle. Reference is now made to FIG. 3 where identical or identically functioning parts are identified with the same reference numerals as in the previous Figure, but with the letter a attached.

The embodiment according to FIG. 3 differs from the embodiment of FIG. 2 in that a depressed profile with main depressions 15a and 16a is provided in a sidewall 18 of the rear loading compartment of the minivan. Reference numeral 19 indicates a fastening bracket which prevents that the transport frame 1 or the grip 9 of a mobile transportation device inserted into the groove-shaped part 17a of the depressed profile can slide out of the groove-shaped depression which could cause the mobile transportation device to fall over into the cargo compartment.

Figure 4:
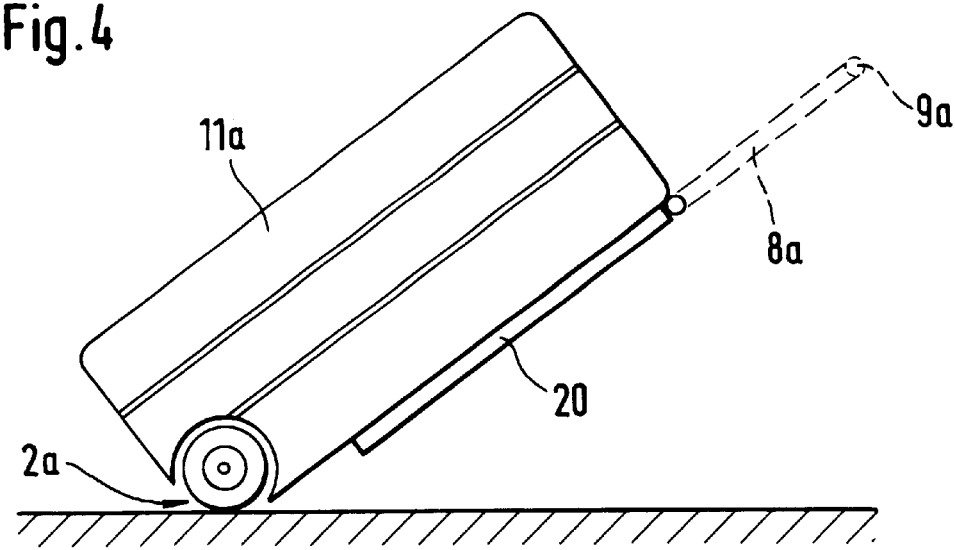
FIG. 4 a further embodiment of a mobile transportation device for use according to the invention.

Reference is now made to FIG. 4 wherein a further embodiment of a mobile transportation device is illustrated.

The dimensions of this transportation device are determined by the loadable container 11a. The container 11a shown in the illustrated embodiment has standardized size and is provided at its underside with guide rails 20 in which the pulling/pushing rod pair 8a is slidably supported. The pulling rods of the pushing rod pair 8a are connected to one another by a grip 9a, wherein the grip, as shown in FIG. 4, can be pulled, together with the pushing rod pair, out of the guide rails 20 and can be locked in the illustrated position by devices that are not shown.

The mobile transportation device of FIG. 4 is provided with a motor drive in the same manner as the device of FIG. 1, wherein in the Figure the non-represented motors are accommodated in the wheels 2a. The wheels 2a are arranged in lateral cutouts of the container 11a such that they will not project past the outer contour of the container 11a. A battery for energy supply of the motors in the wheels as well as an electronic motor control unit, not shown in FIG. 4, are accommodated within the container 11a.

Figure 5:
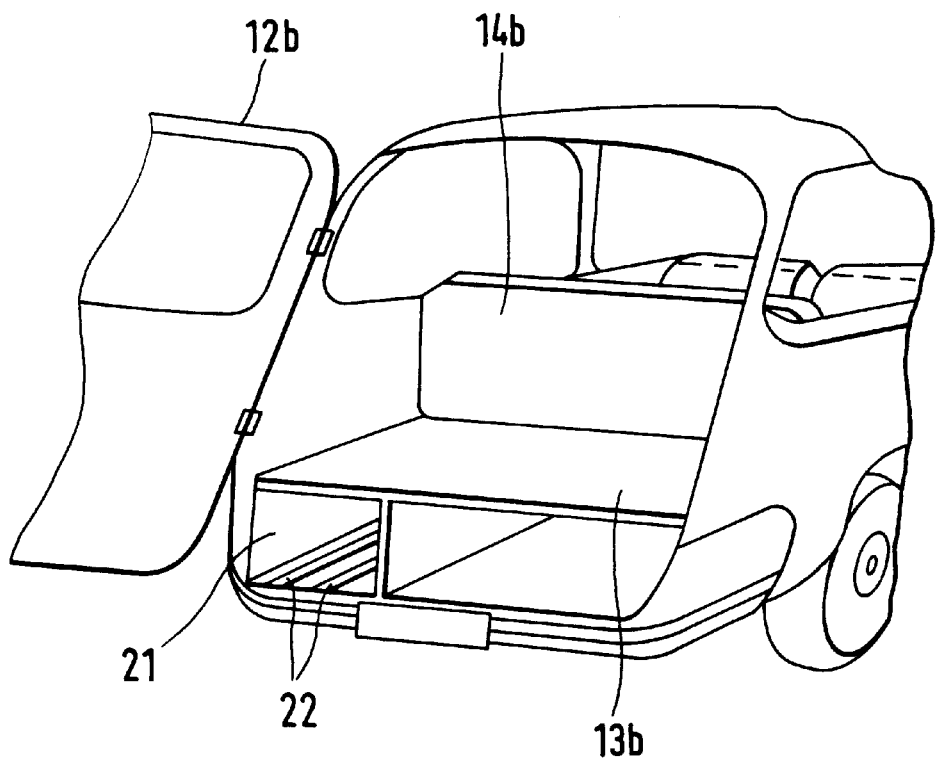
FIG. 5 a vehicle designed for carrying the transportation device of FIG. 4.

As can be taken from FIG. 5, in which same parts or parts having the same function are identified with the same reference numeral as used in FIGS. 2 and 3 but with the letter b attached, a receiving space 21 can be provided for the mobile transportation device of FIG. 4, for example, behind the rear seat 14b of the vehicle below the loading floor surface 13b. The receiving space has substantially the same dimensions as the container 11a. The receiving space 21 has guide grooves 22 for the guide rails 20.

The mobile device of FIG. 4, whose wheels 2a do not project past the outer contour of the container 11a, can be inserted into the receiving chamber 21 for storage in the vehicle. Subsequently, the grip 9a can be collapsed by insertion into the pulling rod pair 8a such that the grip 9a is approximately flush with the end of the container 11a.

With a corresponding standardization of the receiving chamber 21, the transportation device of FIG. 4 having standard dimensions could be used in vehicles of various types and various manufactures.

In contrast to the shown insertion possibility of the mobile device into the recieving space 21, it would also be possible to design a receiving space such and to provide ramp devices such that the mobile device can be driven into the vehicle for being carried therein.

Carrying the mobile device is not limited to cars or minivans; it is also conceivable that mass transport vehicles including rail vehicles are used. The mobile device could be constructed in deviation from the above shown embodiment according to different transportation purposes.

What is claimed is:

1. A transportation system comprising:
   a mobile transportation cart and a vehicle larger than the mobile transportation cart wherein the mobile transportation cart is configured to be carried in the vehicle and to be operated by being driven by muscle force by pulling or pushing;
   the vehicle configured to carry the transportation cart;
   the mobile transportation cart having an electrical drive that is activated by the operation of the mobile transportation cart, wherein the electrical drive is configured to be activated by manipulation of the mobile transportation cart;
   the mobile transportation cart, when carried in the vehicle, being in functional connection with the vehicle;
   at least one of a device for charging the battery of the electrical drive, configured to be in communication with an electrical system of the vehicle, and of a signaling device, configured to indicate the presence or absence of the mobile transportation cart in the vehicle.

2. The transportation system according to claim 1, wherein the electrical drive comprises a drive control having a sensor, wherein the sensor is configured to detect the muscle force exerted for driving, wherein the drive control is configured to adjust the drive force of the electrical drive in a compensating manner based on a predetermined value of a muscle force to be exerted.

3. The transportation system according to claim 2, wherein the predetermined value of the muscle force to be exerted is adjustable.

4. The transportation system according to claim 1, wherein the mobile transportation cart has a pulling/pushing rod actuated by muscle force and is configured to be steered by pulling or pushing the pulling/pushing rod for changing a travel direction of the mobile transportation cart.

5. The transportation system according to claim 1, wherein the mobile transportation cart is configured to be reducible in size.

6. The transportation system according to claim 5, wherein the mobile transportation cart is reducible to a standardized size for being carried in the vehicle.

7. The transportation system according to claim 5, wherein the mobile transportation cart is foldable or collapsible.

8. The transportation system according to claim 1, wherein the mobile transportation cart is configured to be coupled to a container or comprises a container.

9. The transportation system according to claim 8, wherein the container has standardized dimensions.

10. The transportation system according to claim 8, wherein the dimensions of the mobile transportation cart do not surpass the dimensions of the container.

11. The transportation system according to claim 8, wherein the mobile transportation cart can be reduced in size to the dimensions of the container.

12. The transportation device according to claim 1, wherein the vehicle is a car or minivan.

13. The transportation system according to claim 1, wherein the vehicle has holding devices for carrying the mobile transportation cart.

14. The transportation system according to claim 13, wherein the holding devices comprise means for attaching the mobile transportation cart to the vehicle.

15. The transportation system according to claim 13, wherein the holding devices are configured to secure the mobile transportation cart in a state of reduced size.

16. The transportation system according to claim 13, wherein the holding devices are configured to provide a support against which the mobile transportation cart is pushed for reducing the size of the mobile transportation cart.

17. The transportation system according to claim 13, wherein the holding devices are permanently installed on the vehicle and matched to the mobile transportation cart.

18. The transportation device according to claim 17, wherein the holding devices have standardized dimensions.

19. The transportation system according to claim 18, wherein the holding devices have a receiving space having a shape matched to the mobile transportation cart.

20. The transportation system according to claim 18, wherein the holding devices have a receiving space having a shape matched to the mobile transportation cart and receiving niches having a shape matched to parts of the mobile transportation cart.

21. The transportation system according to claim 19, wherein the holding devices have receiving niches having a shape matched to parts of the transportation cart.

22. The transportation system according to claim 1, wherein the mobile transportation cart is configured to be driven into the carrier vehicle for being carried in the carrier vehicle.

* * * * *